A. M. GOW.
LOCKING MECHANISM FOR DUMP CARS.
APPLICATION FILED MAR. 14, 1921.
1,397,165.
Patented Nov. 15, 1921.
2 SHEETS—SHEET 1.
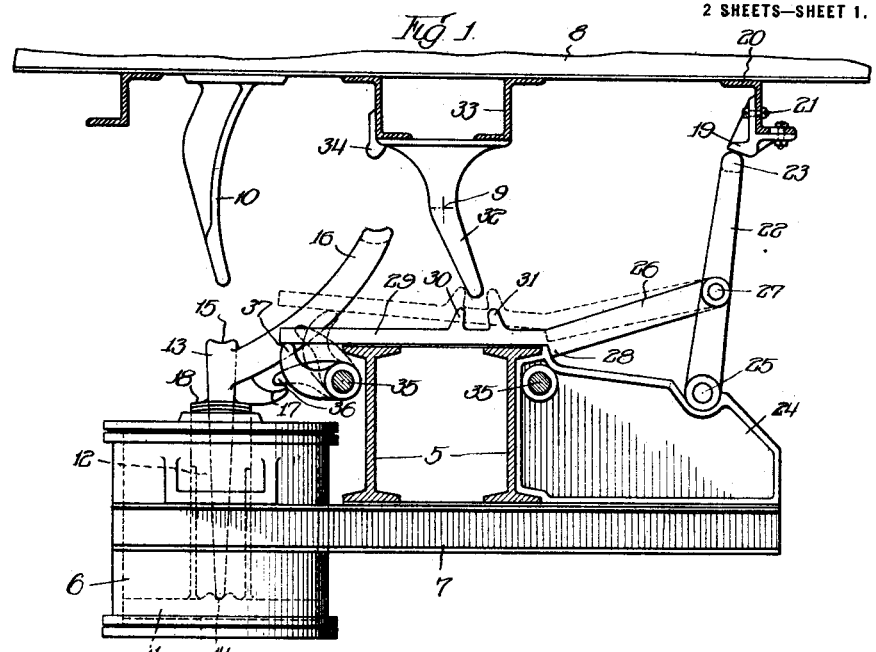
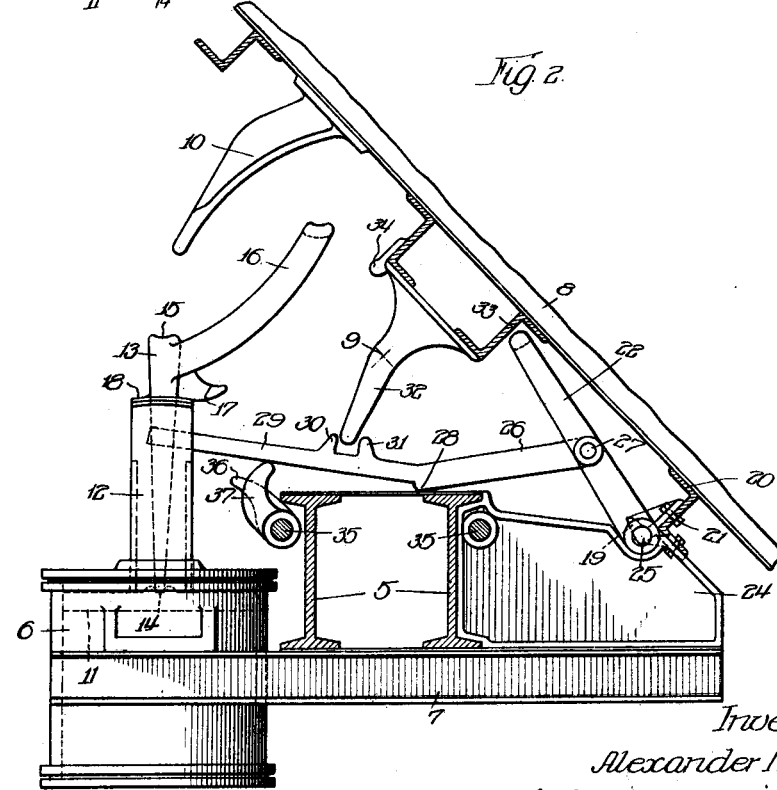
Witness:
R. Burkhardt.
Inventor:
Alexander M. Gow,
By D. Anthony Usina
atty.

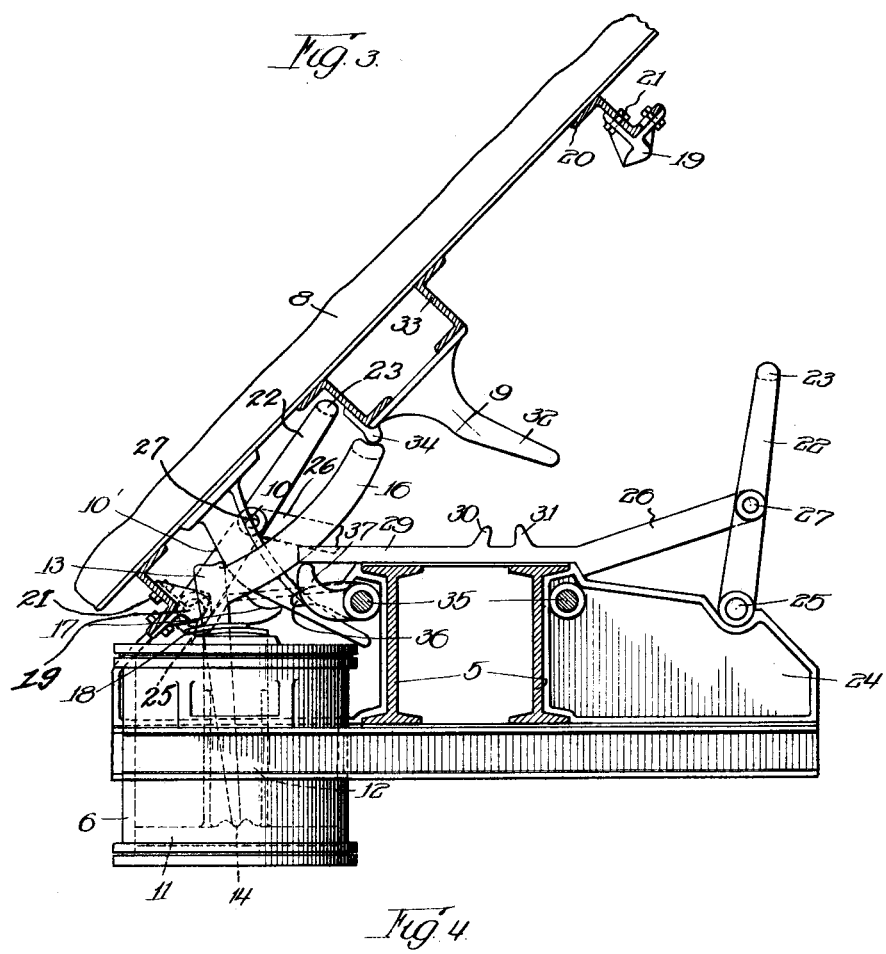
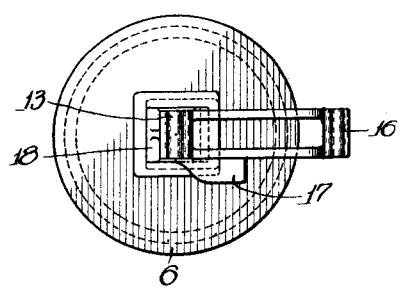

UNITED STATES PATENT OFFICE.

ALEXANDER M. GOW, OF DULUTH, MINNESOTA.

LOCKING MECHANISM FOR DUMP-CARS.

1,397,165.  Specification of Letters Patent.  Patented Nov. 15, 1921.

Application filed March 14, 1921. Serial No. 451,985.

*To all whom it may concern:*

Be it known that I, ALEXANDER M. GOW, a citizen of the United States, residing at Duluth, in the county of St. Louis and State of Minnesota, have invented certain new and useful Improvements in Locking Mechanism for Dump-Cars, of which the following is a specification.

This invention relates to a new and improved dump car, and more particularly to means for actuating and locking a dump car of the type comprising a car body pivoted to a car frame and adapted to be dumped by oscillation upon the pivots to either side. Owing to the necessarily high center of oscillation and also to the high center of gravity of the load, car bodies of this type have a great tendency to rock from side to side. This is particularly true when used upon relatively rough construction tracks, and it is therefore essential that these bodies be positively braced when in the horizontal position. This bracing should comprise a rigid support, since even slight play will permit movement sufficient to cause considerable rack and wear to the parts.

My invention relates to the type of cars of this character which are operated by means of fluid pressure pistons which serve to actuate the dumping mechanism.

It is an object of the present invention to provide fluid operated dumping and righting mechanism which is relatively simple in its design, which is composed of comparatively few parts and which is positive in its operation. It is also an object to provide locking mechanism adapted to coact with the operating mechanism. It is a further object to provide a device of this character in which all parts are adapted to be made of sufficient size to withstand heavy usage. Other and further objects will appear as the description proceeds.

Broadly, my invention comprises a car provided with paired cylinders, one located upon each side of the car, the cylinders adapted to operate plungers which engage portions extending from the car body, to move that body. A particular feature of the construction lies in the fact that the body is normally locked and that the movement of the piston during the first part of its stroke serves only to unlock the body. The movement of the body is caused by the latter portion of the stroke of the piston. A very important feature lies in the fact that the piston serves only to unlock and that the displacement of the bracing means is accomplished by association with the car body during its movement. Another feature of the invention lies in the fact that the pistons engage different portions of the body when righting and when dumping the car and that the portion engaged when righting is located closer to the center of oscillation than that engaged when dumping.

I have illustrated a preferred embodiment of my invention in the accompanying drawings, in which—

Figure 1 is a somewhat diagrammatic cross section showing the left-hand cylinder and the operating mechanism in normal position;

Fig. 2 is a view similar to Fig. 1, showing the car body dumped to the right;

Fig. 3 is a view similar to Fig. 1 showing the car body dumped to the left; and

Fig. 4 is a plan view of the push member and cylinder.

Referring to the figures, the car frame 5 as shown comprises two longitudinal I-beams, the cylinder 6 being carried thereon by means of the cross beam 7. The car body 8 is supported upon pivots carried by the frame members 5 and is adapted to oscillate about the point 9. These pivots are of standard construction and form no part of the present invention and are therefore omitted for the sake of clearness. The dumping horn 10 is secured to the car body above the cylinder 6. This cylinder 6 carries the piston 11, the latter supporting an integral hollow piston member 12. Fitting within this piston member 12 is the push member 13, its lower end being pivotally associated with the piston at 14 and its upper portion being of a size to allow a limited lateral play in the hollow piston member 12. The upper end of this push member 13 is provided with a seat 15 adapted to engage the dumping horn 10. The member 13 is further provided with a laterally and upwardly extending righting arm 16 and with the laterally extending unlocking lug 17. The righting arm as shown in Fig. 4 is slotted and adapted to permit the horn 10 to pass therethrough under certain conditions. The member 13 is provided with the integral shoulder or apron 18 which serves as a cover to close the opening in the hollow piston rod 12.

The adjustable dumping casting 19 is secured to the outer body sill 20 by means of the bolts 21 which coact with slots in the sill. The locking arm 22 is provided with a rounded head 23 engaging the dumping casting 19 and its lower end is hingedly connected to the body bolster 24 at the point 25. The locking member 26 is hingedly connected at 27 to the arm 22 and extends laterally inward of the car. It is provided with a shoulder 28 adapted to engage the body bolster 24 and with a portion 29 which continues across the car frame 5. This portion 29 is provided upon its upper surface with spaced lugs 30 and 31 which are adapted to engage the center leg 32, which latter extends downwardly from the center sills 33 of the car. The righting casting 34 is secured to the side of the center body sills adjacent the dumping horn 10. The locking shafts 35 are supported in the body bolster 24 and extend longitudinally of the car. These shafts 35 are provided with actuating cams 36 adapted to be engaged by the unlocking lugs 17, and with unlocking cams 37 adapted to engage the inner ends of the locking members 26.

In the operation of the device, air is introduced into the cylinder 6 below the piston 11 which serves to move that piston upwardly. The weight of the righting arm assures that the push member 13 is in such position that when lifted with the piston the unlocking lug 17 engages the actuating cam 36 during the first portion of its upward movement. This engagement serves to rotate the shaft 35, and the unlocking cam 37 consequently lifts the locking member 26, the parts assuming the dotted line position shown in Fig. 1. In this position the locking shoulder 28 is lifted out of engagement with the body bolster 24, and also the spaced lugs 30 and 31 are lifted until they are upon opposite sides of the center leg 32.

As the lift of the push member 13 continues the seat 15 engages the dumping horn 10 and the car body is rotated about its axis 9. This rotation is permitted, since as the rotation begins the center leg 32 swings laterally to the left, moving with it the locking member 26. The member 26, due to its pivoted connection at 27 with the locking arm 22, draws that member laterally out of engagement with the casting 19. This movement is also caused by the cam action of the dumping casting 19 against the head 23 of the arm 22. When thrown off center, gravity continues the dumping action until the parts assume the position shown in Fig. 2.

It is to be understood that the parts shown in these figures are exactly duplicated in reverse position in another transverse plane of the car. In lieu of showing this other plane, for the purpose of describing the righting action, reference is made to Fig. 3, in which the car is shown dumped to the left. It will be observed that as the car has reached the dumping position the righting casting 34 has engaged the seat upon the righting arm 16 of the push member. The dumping horn 10 has passed inside the righting arm 16, the extension 10' having engaged the push member 13 and thrown it to the left to the limit of its movement in the hollow piston 12. Upon air now being given to the cylinder 6 below the piston 12 and that piston being forced upwardly, the thrust of the push member against the righting casting 34 serves to right the car body, rotating it about its pivot 9. It will be observed that, due to the lateral displacement given the member 13, as this member rises the unlocking lug 17 does not engage the unlocking cam 36. The locking arm 22 is therefore not moved but remains rigidly locked in place to engage the casting 19 as the car comes to the horizontal position, and thus prevents the car being tipped to the other side. The locking arm 22 upon the left side of the car when the car is righted from being dumped to the left, as shown in Fig. 3, is carried from a position similar to that in which this member 22 is shown in Fig. 2 by means of the engagement between the center leg 32 and the lugs 30 and 31. As the car rotates, the locking shoulder 28 drops down in place against the body bolster and the upper end of the arm 22 engages the locking casting upon the left side of the car to prevent rebound and to effectively lock the car in horizontal position. The locking casting 19 has its lower face, which engages the member 23 of the locking arm 22, made upon a slight angle relative to the arc of movement of the member 23, so that there is a slight camming action which insures the parts against vibration and play, and which, as has been stated, plays an important part in the dumping action. In order to take up wear and to permit relative adjustment of these parts, the casting 19 is adjustably secured to the side sills 20 and is adjusted relative thereto by the interposition of shims or similar means as needed.

But little power is required to right the empty car as compared to a great deal of power required to dump the full car. It is highly desirable that as little air as possible be used in the operation of these dump cars. With the construction shown a full cylinder of air is used to dump the car, while to right the car only a half cylinder is required because of the short arm between the righting casting 34 and the center of oscillation 9. This leverage is quite sufficient, however, for the righting operation, and it will be seen that this mechanism therefore effects the saving of approximately half the air when the car is being righted, as compared to the amount of air necessary were a full cylinder used.

The operating and locking mechanism which has been shown is composed of but few and rugged parts which are adapted to stand the very hard service which apparatus of this kind undergoes. The device is simple in its operation and may be installed at comparatively small cost.

While I have shown a preferred form, the particular details may be modified as required to suit the apparatus to varying conditions of use within the scope of the appended claims.

I claim:

1. In a dump car, a car body, a body bolster, a locking arm engaging at its lower end the body bolster and at its upper end the car body, the locking arm being adapted to be moved from a locking position to an unlocked position by pressure of the car body thereon, and a locking member so associated with the locking arm and the car body as to cause the locking arm to be moved to locking position by movement of the car body, the locking member being dissociated from the car body when in the locking position.

2. In a dump car, a car body, a body bolster, a locking arm engaging at its lower end the body bolster and at its upper end the car body, the locking arm being adapted to be moved from a locking position to an unlocked position by pressure of the car body thereon, a locking member pivoted to the locking arm and provided with lugs, and a member rigid with the car body and adapted to engage the lugs to move the locking member.

3. In a dump car, a car body, a body bolster, a locking arm engaging at its lower end the body of the bolster and at its upper end the car body, a locking member pivoted to the locking arm and provided with lugs, and a member carried by the car body and adapted to engage the lugs to move the locking member when the latter is in unlocked position, said movement actuating the locking arm.

4. In a dump car, a car body, a body bolster, a locking arm engaging at its lower end the body bolster and at its upper end the car body, the locking arm being adapted to be moved from a locking position to an unlocked position by pressure of the car body thereon, a locking member pivoted to the locking arm and provided with lugs, a member rigidly carried by the car body and adapted to engage the lugs to move the locking member, and means adapted to successively move said locking member to unlocked position and to dump the car body.

Signed at Duluth, Minnesota, this 8th day of March, 1921.

ALEXANDER M. GOW.